United States Patent [19]

Ray

[11] Patent Number: 5,136,428
[45] Date of Patent: Aug. 4, 1992

[54] FLAT-PLATE OPTICAL DEVICE HAVING A GRADIENT INDEX OF REFRACTION FOR CORRECTING SPATIAL DISTORTIONS

[75] Inventor: Rajarshi Ray, Princeton, N.J.

[73] Assignee: AT&T Bell Laboratories, Murray Hill, N.J.

[21] Appl. No.: 709,564

[22] Filed: Jun. 3, 1991

[51] Int. Cl.$^5$ .............................................. G02B 5/00
[52] U.S. Cl. ................... 359/654; 359/652; 359/900; 358/55; 358/250
[58] Field of Search ............... 350/168, 413, 286, 320, 350/321; 358/55, 245, 247, 250, 252; 359/652, 653, 654, 900, 837, 615

[56] References Cited

U.S. PATENT DOCUMENTS

| | | | |
|---|---|---|---|
| 2,999,126 | 9/1961 | Harries et al. | 358/55 |
| 3,634,617 | 1/1972 | Welford | 358/60 |
| 3,667,832 | 6/1972 | Kitano et al. | 450/413 |
| 3,729,253 | 4/1973 | Moore et al. | 350/175 |
| 4,245,890 | 1/1981 | Hartman et al. | 350/413 |
| 4,331,380 | 5/1982 | Rees et al. | 350/413 |
| 4,589,736 | 5/1986 | Harrigan et al. | 350/413 |
| 4,929,065 | 5/1990 | Hagerty et al. | 359/653 |

OTHER PUBLICATIONS

J. A. Mauro, *Optical Engineering Handbook*, General Electric Company, 1966, pp. 26-39.

*Primary Examiner*—Bruce Y. Arnold
*Assistant Examiner*—R. D. Shafer
*Attorney, Agent, or Firm*—Robert B. Levy

[57] ABSTRACT

Distortion of the image displayed by a cathode ray tube display (10,10') can be compensated by placing a flat-plate optical device, fabricated from two plates (14,14') of optical material joined at their edges an an angle, in the field of view of the display. Each of the plates (14,14') is advantageously constructed so as to have a gradient index of refraction such that the index of the plate changes across its length from its free edge to the vertex (16) formed with the other plate. By fabricating each of the plates (14 and 14') such that the index of refraction of each decreases or increases from the free edge of each plate to the vertex formed with the other plate, the device formed by the plates will compensate for either barrel or pincushion distortion, respectively.

7 Claims, 1 Drawing Sheet

FLAT-PLATE OPTICAL DEVICE HAVING A GRADIENT INDEX OF REFRACTION FOR CORRECTING SPATIAL DISTORTIONS

TECHNICAL FIELD

This invention relates to a flat-plate optical device having a gradient index of refraction, and the use of such device for correcting distortion in the image produced by a an optical system, e.g., an illumination system or cathode ray tube.

BACKGROUND OF THE INVENTION

The vast majority of television displays now in use employ a cathode ray tube. While great strides have been made in the development of high-quality cathode ray tubes, most still exhibit some degree of distortion. Such distortion is commonly characterized as either negative or positive distortion, depending on whether the picture elements (pixels) in the displayed image tend to bunch at the center or the edges. Negative distortion, also referred to as "pincushion distortion," results when the angle between rays radiating between the image plane and the focal plane of the cathode ray tube appears greater for the same rays radiating between the focal plane and the object plane. Conversely, positive distortion, also referred to as "barrel distortion," results when the angle between rays radiating between the image plane and the focal plane appears smaller for the same rays radiating between the focal plane and the object plane.

The amount of distortion that can be tolerated usually depends on the application for which the cathode ray tube is being employed. For some high-precision applications, even a small degree of barrel or pincushion distortion cannot be tolerated. For such applications, very optically precise cathode ray tubes are required which are costly to manufacture. Other optical systems, including illumination and lensing systems also suffer from these types of distortions.

There is a need for a technique for correcting distortion exhibited by an optical system without the need to modify the system itself.

SUMMARY OF THE INVENTION

Briefly, in accordance with a preferred embodiment of the invention, a flat-plate optical device is provided for placement between an optical system and a viewer for spatially separating rays radiated by the display to compensate for distortion. The optical device is comprised of two flat plates which are joined at their edges in a manner such that the rays from the cathode ray tube impinging on a separate one of the plates are at an acute angle therewith. Each of the two plates has a gradient (varying) index of refraction such that the index changes laterally thereacross from the free edge of the plate to the edge which forms a vertex with the other plate. The gradient index of refraction of the plates causes a non-uniform displacement of the rays passing therethrough from the display so as to compensate for the spatial distortion in the image produced thereby.

DETAILED DESCRIPTION

Figure 1:
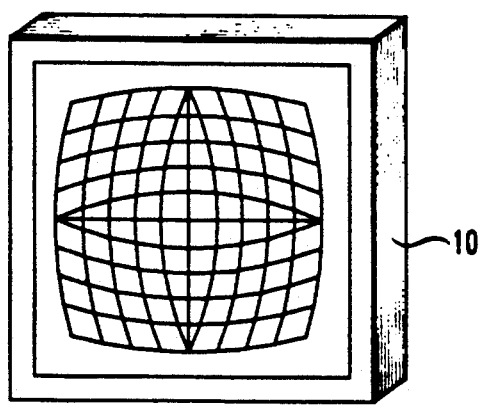
FIG. 1 is an image produced by a prior art cathode ray tube display showing the effect of pincushion distortion.
Figure 2:
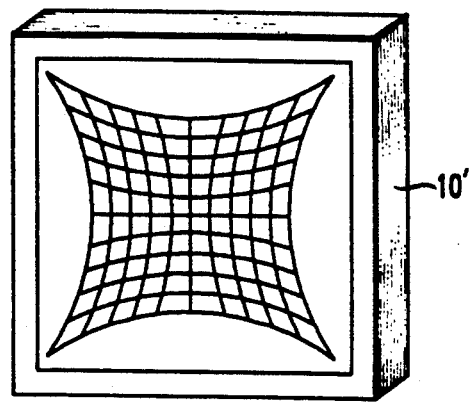
FIG. 2 is an image produced by a prior art cathode ray tube display showing the effect of barrel distortion.

FIGS. 1 and 2 each shown an image of a grid of uniformly horizontal and vertical lines displayed by a separate one of a pair of prior art cathode ray tube displays 10 and 10' (e.g., television monitors) which suffer from positive and negative (barrel and pincushion) distortion, respectively. The image displayed by the monitor 10 of FIG. 1 is characterized by bunching of the picture elements (pixels) at the edges of the image. Conversely, the image displayed by the monitor 10' of FIG. 2 is characterized by bunching of the picture elements at the center of the image. The positive and negative distortion suffered by the cathode ray tube displays 10 and 10' of FIGS. 1 and 2, respectively, has been exaggerated for purposes of illustration.

Figure 3:
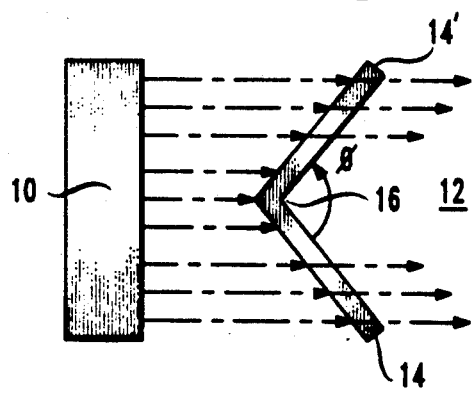
FIG. 3 is a side view of a flat-plate optical device in accordance with the invention placed within the optical path of the cathode ray tube display of FIG. 1 for refracting the rays radiated therefrom to compensate for spatial distortion.

Referring to FIG. 3, there is shown a flat-plate optical device 12, in accordance with the invention, for placement in the field of view of a cathode ray tube display for spatially displacing optical rays radiated by the device to compensate for the distortion suffered thereby. In an illustrated preferred embodiment, the device 12 has been configured to compensate for positive (barrel) distortion suffered by the display 10 although, as will be explained, the device of the invention can be readily configured to compensate for negative (pincushion) distortion as well.

The flat-plate optical device 12 of the invention is preferably comprised of two separate plates 14 and 14' of optical material, such as glass or plastic, having their edges joined at a vertex 16 such that the plates are angled relative to each other. The interior angle $\theta$ between the plates 14 and 14' (the angle facing a viewer of the display 10) is typically selected so as to be $60° < \theta < 180°$. A support mechanism (not shown) is provided to support the device 12 between the viewer and the display device 10' such that the vertex 16 is aligned with the center of the image displayed by the display 10.

To compensate for the barrel distortion suffered by the display device 10 of FIGS. 1 and 3, each of the plates 14 and 14' of the device 12 is constructed to have a gradient index of refraction ($\mu$) which increases laterally across the plate from the edge jointed at the vertex 16 to its free edge. With the plates 14 and 14' constructed in this manner and positioned with their vertex 16 at the center of the displayed image, the rays radiated by the display 10' will be refracted by an amount in accordance with the lateral distance between the vertex 16 and the point where the ray strikes each plate. Thus, those rays which strike a separate one of the plates 14 and 14' closest to the free edge thereof will be refracted (i.e., spatially displaced) much more than those rays which strike on a separate one of the plates closest to the vertex 16. By spatially displacing the rays from the display 10 which radiate from the edge thereof by a larger amount than the rays radiating from the center of the display, the plates 14 and 14' of the device 12 effectively separate the pixels in the image by a greater amount at the edges, exactly what is necessary to compensate for barrel distortion.

Figure 4:
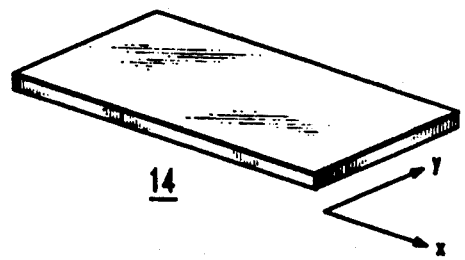
FIG. 4 is a perspective view of one of a pair of plates comprising a first embodiment of the flat-plate optical device of FIG. 3.
Figure 5:
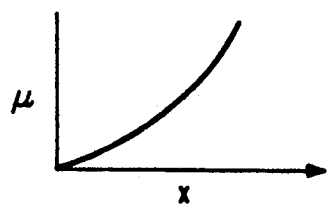
FIG. 5 is a plot of the index of refraction along a single axis of the plate of FIG. 4.
Figure 6:
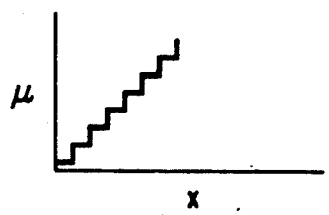
FIG. 6 is a perspective view of one of a pair of plates comprising a second embodiment of the flat-plate optical device of FIG. 3.
Figure 7:
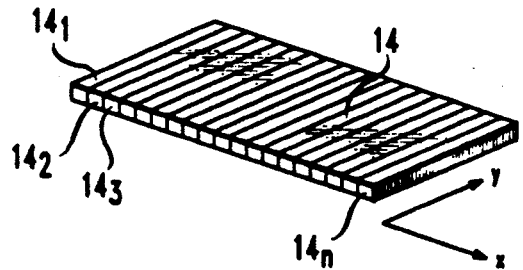
FIG. 7 is a plot of the index of refraction along a single axis of the plate of FIG. 6.

Referring now to FIG. 4, the plate 14 (as well as the plate 14' (not shown)) can be manufactured of a single integral piece of optical material (e.g., glass or plastic) whose index of refraction $\mu$ varies continuously along its length (its x axis) as indicated by the plot of $\mu$ versus x depicted in FIG. 5. Alternatively, as indicated in FIG. 6, the plate 14 (as well as the plate 14' (not shown)) can be fabricated from individual strips $14_1, 14_2, 14_3 \ldots 14_n$, where n is an integer, with each strip having a successively increasing index of refraction. When the plate 14 is fabricated in this manner, the relationship between the index of refraction $\mu$ as a function of position along the strips' x axis will appear as a "staircase" function as indicated in FIG. 7.

The value of the angle $\theta$ between the plates 14 and 14' of FIG. 3, as well as the index of refraction $\mu$ at the point where each ray from the display 10 strikes a separate one of the plates, the gradient of the index of refraction $\mu$, and the rate of change of the gradient, all affect the performance of the device 12. The manner in which these parameters are established is dependent on the degree of distortion in the image displayed by the display 10. In practice, the distortion is typically modeled prior to actual fabrication of each of the plates 14 and 14', and the amount of compensation, as determined by such modeling, establishes the value of these parameters. Note that by changing the direction in which the index of refraction $\mu$ of the plates 14 and 14' is made to vary, such as by varying the index of refraction along width width (y axis), the plates can be made to act as lenses.

The foregoing describes a flat-plate optical device 12, comprised of two plates 14 and 14' joined at their edges at an angle, with each having a gradient index of refraction from their vertex 16 to the free edge of each for successively refracting the rays radiated by a display device 10 or 10' to compensate for distortion. While the illustrated preferred embodiment of the flat-plate optical device 12 has been described for barrel distortion, by fabricating the plates 14 and 14' so each has a gradient index of refraction which decreases from their free edges to their vertex 16, the flat-plate optical device would now compensate for pincushion distortion.

It is to be understood that the above-described embodiments are merely illustrative of the principles of the invention. Various modifications and changes may be made thereto by those skilled in the art which will embody the principles of the invention and fall within the spirit and scope thereof. For example, while the invention has been specifically described for use with a cathode ray tube display 10,10', it is equally applicable to other optical systems, including those which provide illumination (light sources or the like) or those having one or more lenses.

I claim:

1. A flat-plate optical device for placement in the field of view of an optical system, having an optical axis, to compensate the optical system for distortions, comprising:

first and second plates of optical material, each plate having first and second ends, the first ends of the plates being free and the second ends of the plates being joined together to form a vertex such that the first and second plates are angled with each other and each lies at the same acute angle, with respect to the optical axis of the optical system; and each plate having a gradient index of refraction such that the index of refraction changes along its length from its second end to its first end.

2. The apparatus according to claim 1 wherein the index of refraction of each plate increases from its second end to its first end.

3. The apparatus according to claim 1 wherein the index of refraction of each plate decreases from its second end to its first end.

4. The apparatus according to claim 1 wherein the index of refraction of each plate changes continuously along its length.

5. The apparatus according to claim 1 wherein the index of refraction of each plate changes in discrete steps across its length.

6. A method of compensating for distortions in an optical system, which produces rays generally directed along an optical axis, comprising the steps of:

providing a flat-plate optical device comprising first and second plates of optical material, each plate having first and second ends, the fist ends of the plates being free and the second ends of the plates being joined together, to form a vertex such that the first and second plates are angled with respect to each other, with each plate having a gradient index of refraction such that the index of refraction changes along its length from its second end to its first end;

placing the flat-plate optical device within the field of view of the optical system such that each of the plates is at the same acute angle with the optical axis of the optical system; and refracting a first ray from the optical system which strikes a separate one of the plates near its first end by an amount different from a second ray striking the same plate near its second end to compensate for optical distortion such that the difference in refraction is the same for both plates.

7. A method of compensating for barrel distortion in an optical system which produces rays generally directed along an optical axis, comprising the steps of:

providing a flat-plate optical device, comprising first and second plates of optical material, each plate having first and second ends, the first ends of the plates being free and the second ends of the plates being joined together, to form a vertex such that the first and second plates are angled with respect to each other, with each plate having a gradient index of refraction such that the index of refraction increases along its length from its second end to its first end;

placing the flat-plate optical device within the field of view of the optical system such that each of the plates is at the same angle with the optical axis of the optical system; and refracting a first ray from the optical system which strikes a separate one of the plates near its first end by an amount greater than a second ray striking the same plate near its second end to compensate for barrel distortion such that the difference in refraction is the same for both plates.

* * * * *